(12) United States Patent
Lee et al.

(10) Patent No.: US 8,280,045 B2
(45) Date of Patent: Oct. 2, 2012

(54) TEXT-INPUT DEVICE AND METHOD

(75) Inventors: Sang-jin Lee, Suwon-si (KR);
Kyun-hoe Park, Suwon-si (KR);
Kyoung-won Kim, Yongin-si (KR);
Woon-geun Kwak, Seongnam-si (KR);
Dae-sun Rhee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1222 days.

(21) Appl. No.: 11/594,919

(22) Filed: Nov. 9, 2006

(65) Prior Publication Data
US 2007/0127716 A1    Jun. 7, 2007

(30) Foreign Application Priority Data
Dec. 5, 2005  (KR) .................. 10-2005-0117593

(51) Int. Cl.
*H04L 9/00*  (2006.01)
(52) U.S. Cl. .............................. 380/43; 345/156
(58) Field of Classification Search ............ 340/853,
340/870, 901, 907; 341/1, 20, 50; 345/418,
345/501, 530, 204; 380/200, 243, 247, 251,
380/252, 255; 710/1, 100, 200, 220
See application file for complete search history.

(56) References Cited

U.S. PATENT DOCUMENTS

| | | | | |
|---|---|---|---|---|
| 7,023,428 B2* | 4/2006 | Pihlaja | ......................... | 345/173 |
| 2003/0201972 A1* | 10/2003 | Usuda | ......................... | 345/156 |
| 2004/0080487 A1* | 4/2004 | Griffin et al. | ................. | 345/156 |
| 2006/0082540 A1* | 4/2006 | Prior | ............................. | 345/156 |
| 2006/0227100 A1* | 10/2006 | Kun et al. | ...................... | 345/156 |
| 2006/0242607 A1* | 10/2006 | Hudson | ........................ | 715/863 |
| 2006/0279532 A1* | 12/2006 | Olszewski et al. | ............. | 345/156 |

FOREIGN PATENT DOCUMENTS

| | | |
|---|---|---|
| KR | 1999-17435 | 3/1999 |
| KR | 2001-107477 | 12/2001 |
| KR | 2003-30563 | 4/2003 |

* cited by examiner

*Primary Examiner* — Jeffrey Pwu
*Assistant Examiner* — Nega Woldemariam
(74) *Attorney, Agent, or Firm* — Jefferson IP Law, LLP

(57) ABSTRACT

A text-input device and method is provided. The device includes a display unit that displays a user interface, which is divided into a plurality of areas each including a plurality of cells where predetermined text is displayed, an input unit that includes a plurality of text-input units to provide a focusing signal that focuses on a predetermined cell in the displayed user interface and a selecting signal that selects the focused cell, a user interface providing unit that generates a control signal corresponding to the selected cell with reference to a mapping table according to whether the selecting signal is available, and a control unit that performs a control command based on the control signal, wherein the plurality of text-input units correspond to the areas.

26 Claims, 17 Drawing Sheets

TEXT INPUT GUIDE INTERFACE (200)

| FIRST AREA (210) | | | | | | | SECOND AREA (220) | | | | | |
|---|---|---|---|---|---|---|---|---|---|---|---|---|
| Esc | F1 | F2 | F3 | F4 | F5 | F6 | F7 | F8 | F9 | F10 | F11 | F12 |
| ~ ` | ! 1 | @ 2 | # 3 | $ 4 | % 5 | ^ 6 | & 7 | * 8 | ( 9 | ) 0 | _ - | + = |
| Tab | Q ㅂ | W ㅈ ㅊ | E ㄷ ㄸ | R ㄱ ㄴ | T ㅅ ㅁ | Y ㅛ | U ㅕ | I ㅑ | O ㅐ ㅒ | P ㅔ ㅖ | { [ | } ] |
| Caps | A ㅁ | S ㄴ | D ㅇ | F ㄹ | G ㅎ | H ㅗ | J ㅓ | K ㅏ | L ㅣ | : ; | ? / | |
| Shift | Z ㅋ | X ㅌ | C ㅊ | V ㅍ | B ㅠ | N ㅜ | M ㅡ | < , | > . | ↑ | Delete | Shift |
| Ctrl | | Alt | Space | | | CHINESE CHARACTER | Alt | ← | ↓ | → | Ctrl | |

FIG. 3

MAPPING TABLE (300)

| CELL | | MODE 1 | | MODE 2 | | MODE 3 | | ... | MODE N | |
|---|---|---|---|---|---|---|---|---|---|---|
| | | MODE 1 | MODE 1 + Shift | MODE 2 | MODE 2 + Shift | MODE 3 | MODE 3 + Shift | ... | MODE N | MODE N + Shift |
| FIRST AREA | FIRST CELL | ㅂ | ㅃ | q | Q | § | mg | | | |
| | SECOND CELL | ㅈ | ㅉ | w | W | ↑ | kg | | : | : |
| | : | : | : | : | : | : | : | | | |
| SECOND AREA | FIRST CELL | ㅓ | ㅓ | u | U | ↖ | mm | | | |
| | SECOND CELL | ㅏ | ㅏ | l | L | ↗ | cm | | | |
| | : | : | : | : | : | : | : | | | |

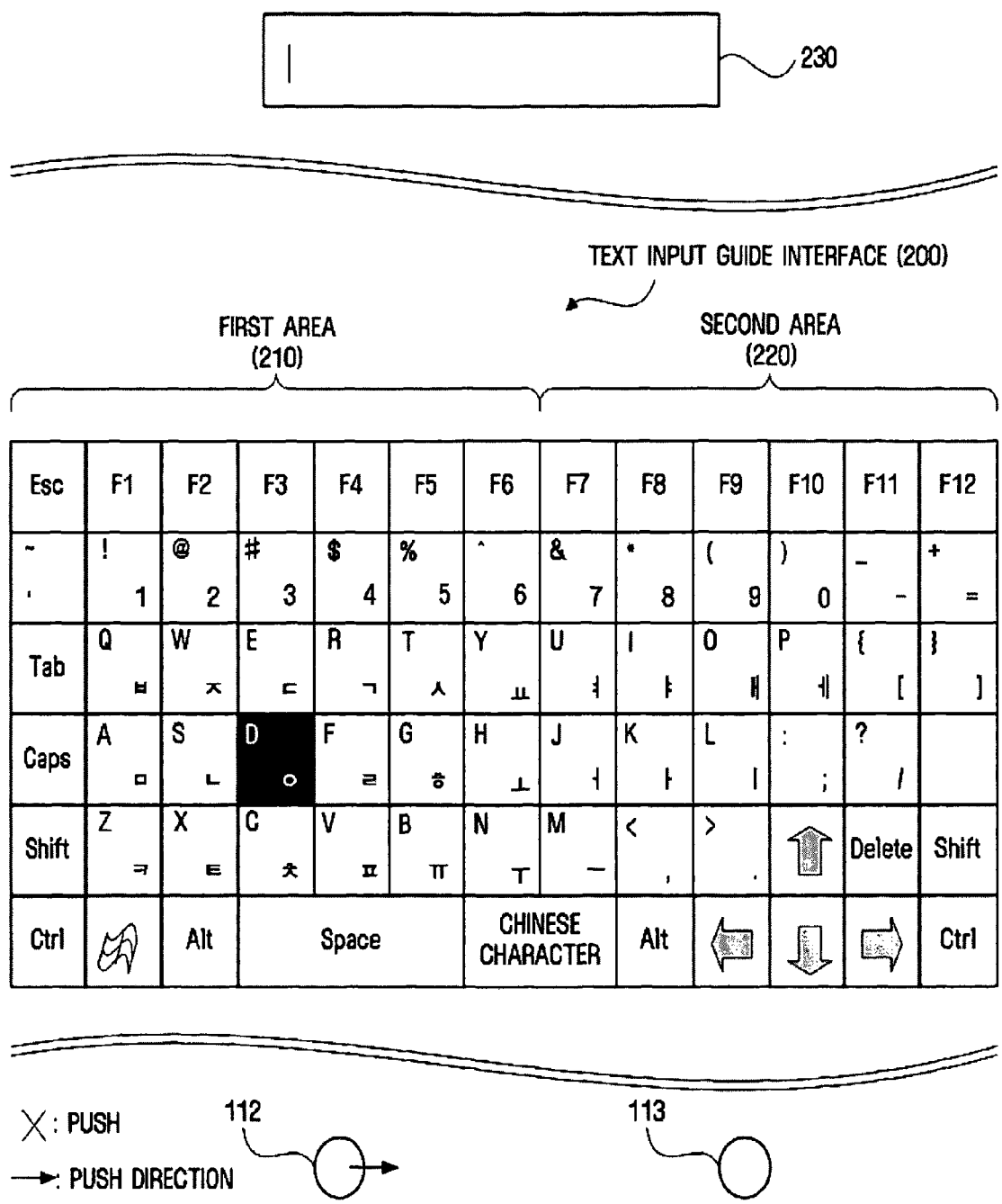

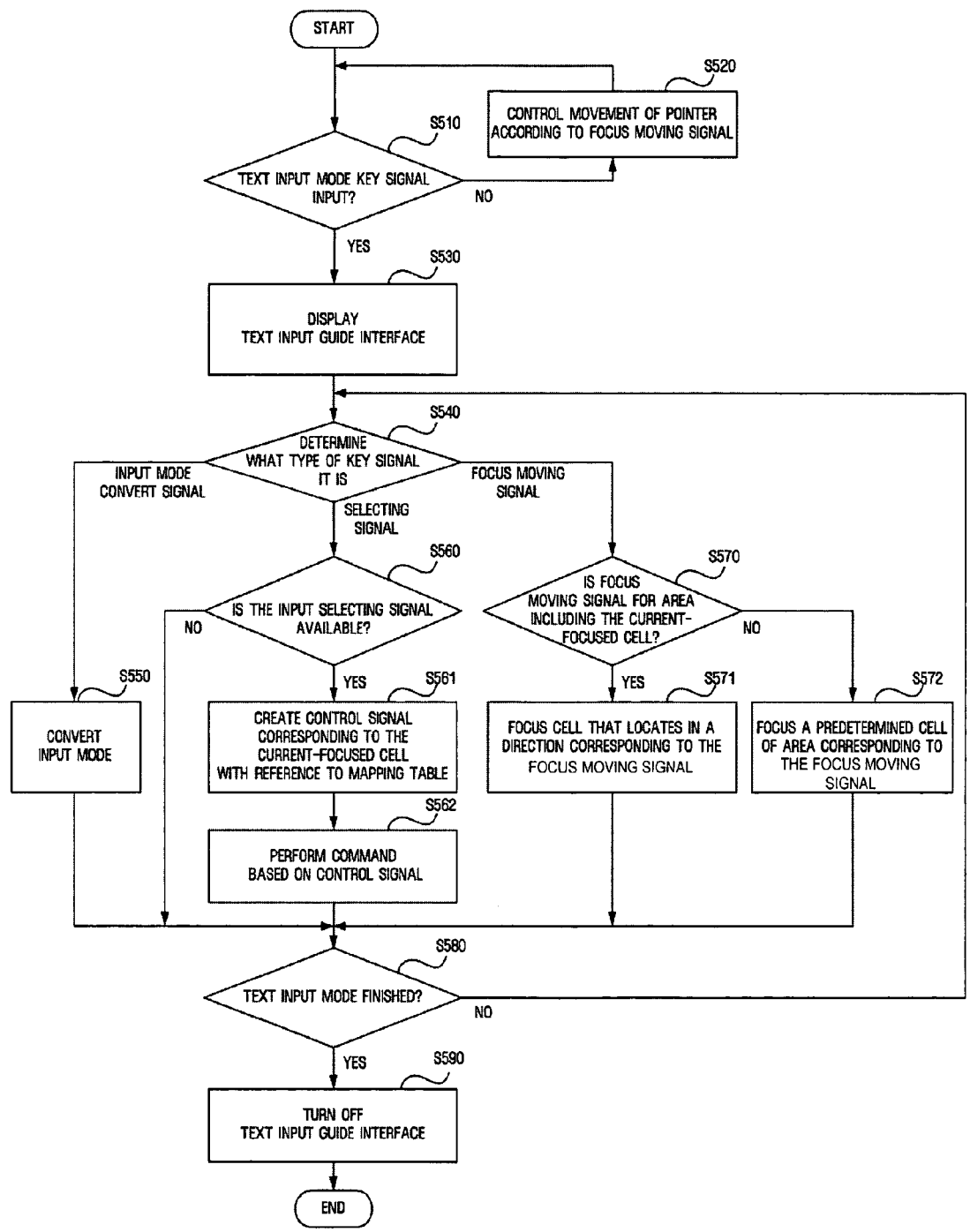

FIG. 6C

TEXT INPUT GUIDE INTERFACE (603)

FIRST AREA (610)     SECOND AREA (620)

| Esc | F1 | F2 | F3 | F4 | F5 | F6 | F7 | F8 | F9 | F10 | F11 | F12 |
|---|---|---|---|---|---|---|---|---|---|---|---|---|
| ~ ` | ! 1 | @ 2 | # 3 | $ 4 | % 5 | ^ 6 | & 7 | * 8 | ( 9 | ) 0 | _ - | + = |
| Tab | § | ↑ | → | ↓ | ↔ | ↕ | ↖ | ↗ | ↘ | ↙ | { [ | } ] |
| Caps | ① | ② | ③ | ④ | ⑤ | ⑥ | ⑦ | ⑧ | ⑨ | : ; | ? / | |
| Shift | ☎ | ♀ | ⚥ | ♠ | ★ | ♥ | ♨ | < , | > . | ⇧ | Delete | Shift |
| Ctrl | 🦷 | Alt | Space | | | CHINESE CHARACTER | | Alt | ⇦ | ⇩ | ⇨ | Ctrl |

TEXT-INPUT DEVICE AND METHOD

CROSS-REFERENCE TO RELATED APPLICATIONS

This application claims the benefit of Korean Application No. 2005-117593, filed Dec. 5, 2005 in the Korean Intellectual Property Office, the disclosure of which is incorporated herein by reference.

BACKGROUND OF THE INVENTION

1. Field of the Invention

An aspect of the present invention relates to a text-input device and method, and, more particularly, to a text-input device and a method of operating a text-input device that enables a user to efficiently input text to a portable digital device, thereby minimizing input error.

2. Description of the Related Art

As computing technologies are developed, the widespread use of portable digital devices such as personal digital assistants (PDA), portable multimedia players (PMP), Play Station Portables™ (PSP), tablet personal computers (PC) increases. Portable digital devices use the following text-input methods.

In the first text-input method, Korean or English letters are mapped to a plurality of number keys. If number keys are input by a user, the input numbers are converted into text codes, and the converted text is displayed. The text-input method is usually used for cellular phones or PDAs that have mobile phone functions.

In the second method, a software keyboard is displayed via a display unit having a touch screen function. And, x- and y-coordinates of the position that a user touches using a stylus (an input means of a PDA) are displayed after being converted into a text code.

In the third method, text is input using a separate keyboard.

However, the conventional text-input methods have a problem in that portability is hampered if a separate keyboard is used, and miniaturizing a digital device may be difficult if text is mapped to a plurality of number keys. Further, since they are small, portable digital devices have a small software keyboard displayed via a display unit. Thus, when a user inputs text using the software keyboard, input error is likely to occur due to the fact that it is not easy to input text.

SUMMARY OF THE INVENTION

To solve the above and/or other problems, an aspect of the present invention provides a text-input device and a method of operating a text-input device that minimizes input error and allows for an increase in text-input speed.

According to an aspect of the present invention, there is provided a text-input device comprising: a display unit that displays a user interface, which is divided into a plurality of areas each including a plurality of cells where predetermined text is displayed; an input unit that includes a plurality of text-input units to provide a focusing signal that focuses on a predetermined cell in the displayed user interface and a selecting signal that selects the focused cell; a user interface providing unit that generates a control signal corresponding to the selected cell with reference to a mapping table according to whether the selecting signal is available; and a control unit that performs a control command based on the control signal, wherein the plurality of text-input units correspond to the areas.

According to another aspect of the present invention, there is provided a text-input method comprising: displaying a user interface divided into a plurality of areas each including a plurality of cells where a predetermined text is displayed, receiving a focusing signal that focuses on a predetermined cell by the displayed user interface and a selecting signal that selects the focused cell from a plurality of text-input units, creating a control signal corresponding to the selected cell with reference to a mapping table according to whether the selecting signal is available, and performing a control command based on the control signal, wherein the plurality of text-input units correspond to the areas.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 illustrates a mapping table according to the embodiment of FIG. 2;

FIGS. 4A to 4J illustrate a text-input guide user interface in accordance with handling a text-input key in a text-input device according to the embodiment of FIG. 2;

FIG. 5 is a flowchart showing operation of a text-input device according to an exemplary embodiment of the present invention; and FIGS. 6A to 6C illustrate a text-input-guide interface indicated according to a mode conversion.

DETAILED DESCRIPTION OF THE EMBODIMENTS

Figure 1A:
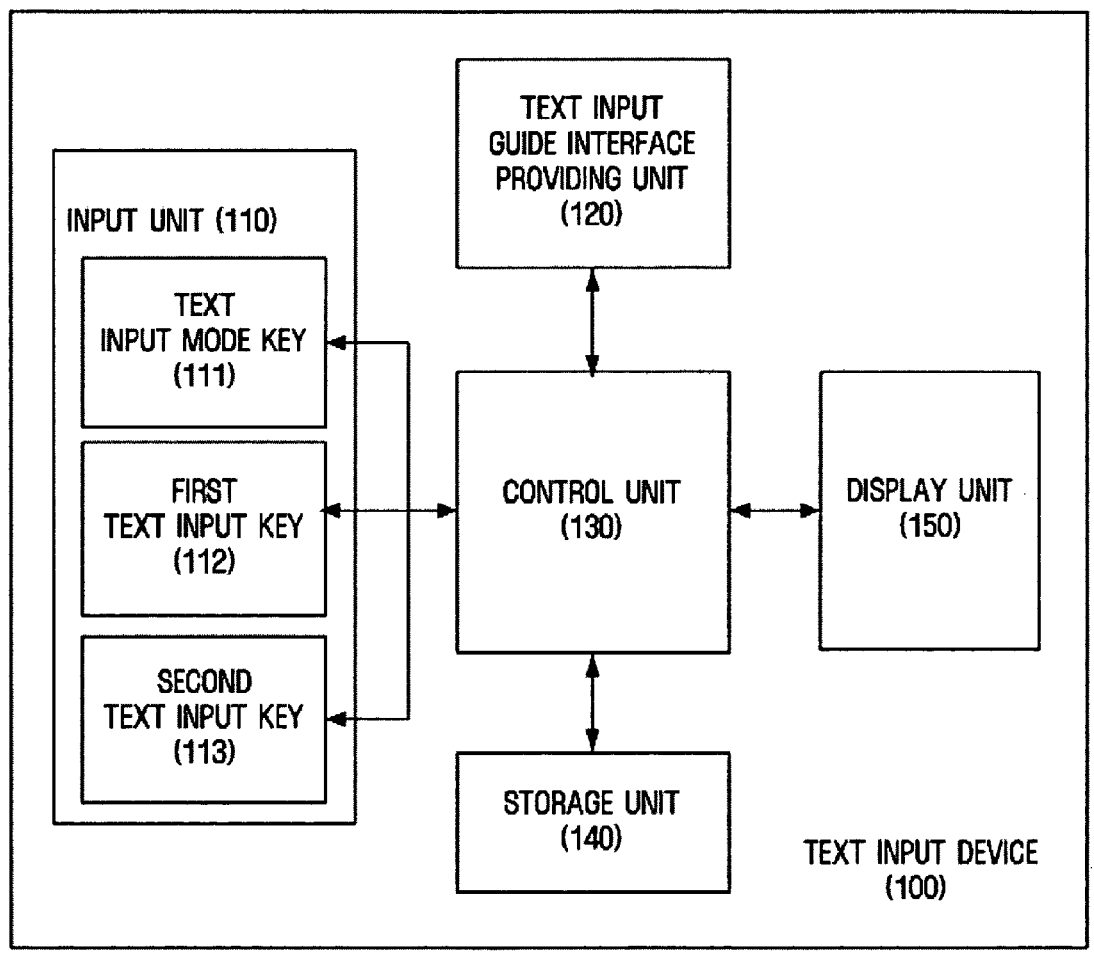
FIG. 1A is a block diagram showing a structure of a text-input device according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figures 1B, 2:
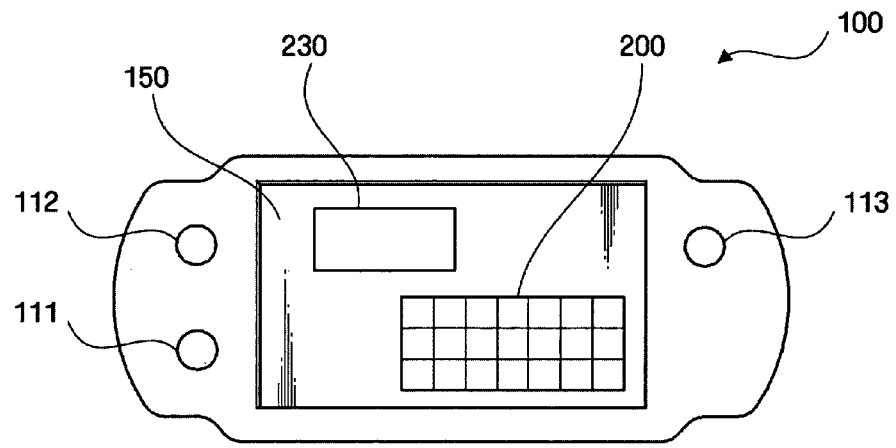
FIG. 1B illustrates the text-input device shown in FIG. 1A.
FIG. 2 illustrates a text-input-guide interface displayed on a text-input device according to an exemplary embodiment of the present invention.

A text-input device 100 according to an exemplary embodiment of the present invention will be described with reference to FIGS. 1A and 1B. FIG. 1A depicts a structure of a text-input device 100 according to an exemplary embodiment of the present invention, and FIG. 1B illustrates the text-input device 100 shown in FIG. 1A.

A text-display device according to an exemplary embodiment of the present invention may be embodied as a digital device. A digital device is a device having a digital circuit that processes digital data, e.g., a computer, a printer, a scanner, a pager, a digital camera, a facsimile, a digital duplicator, a digital home appliance, a digital telephone, a digital projector, a home server, a digital video recorder, a digital broadcast receiver, a digital satellite broadcast receiver, a set-top box, a personal digital assistant (PDA), a cellular phone, a portable media player (PMP), a PlayStation Portable (PSP), and/or a combination thereof.

Specifically, the text display device illustrated in FIG. 1A includes an input unit 110, a storage unit 140, a control unit 130, a text-input-guide-interface-providing unit 120 and a display unit 150. The term "module," as used herein, refers to, but is not limited to, a software or hardware component, such as a Field Programmable Gate Array (FPGA) or an Application Specific Integrated Circuit (ASIC), which executes certain tasks. A module may advantageously be configured to reside in the addressable storage medium, and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules, or further separated into additional components and modules.

The input unit 110, which receives commands from a user, includes a plurality of function keys, e.g., a power key (not shown), a text-input-mode key 111, and text-input keys 112 and 113. When the keys included in the input unit 110 are pressed by a user, the input unit 110 generates a predetermined key signal corresponding to each key.

The text-input-mode key 111 provides a text-input-activating signal that activates a text-input function. The text-input-guide-interface-providing unit 120 displays a text-input-guide interface 200 according to whether the text-input-activating signal is pressed. The text-input-mode key 111 also runs a mode conversion. If the text display device provides a plurality of text-input modes, converting a text-input mode whenever the text-input mode key 111 is pressed is possible.

It is assumed that the text display device provides first, second, and third modes respectively enabling input of Korean text, English text, and/or special text. In this case, the text-input-mode key 111 is pressed and the first mode, i.e., a Korean text-input mode, is activated. If the text-input-mode key 111 is pressed one more time the second mode, i.e., an English text-input mode, is activated. If the text-input-mode key 111 is pressed one more time, the third mode, i.e., a special symbol input mode, is activated.

The text-input-mode key 111 may be separated from or combined with other function keys included in the input unit 110. The case where the text-input-mode key 111 is separated from other function keys will be described below.

The text-input keys 112 and 113 provide a focus-moving signal to move a focus from the text-input-guide interface (refer to a reference number 200 of FIG. 2) to a predetermined cell, and a selecting signal that selects the cell that is focused on. The focus moving signal moves a focus to a cell located in the direction corresponding to the focus moving signal. The text-input keys 112 and 113 may provide a focus moving signal corresponding to left, right, up, down, up-left, up-right, down-left, and down-right directions.

The text-input keys 112 and 113 may each be embodied as a jog switch or a track ball. In either case, when directed in a predetermined direction by a user, both the jog switch and the track ball generate a focus moving signal in the corresponding direction and when clicked by a user, both the jog switch and the track ball generate a selecting signal.

One or more text-input keys 112 and 113 may be embodied to allow for easily inputting text. According to an embodiment of the invention, the number of text-input keys 112 and 113 may be the same as the number of the divided areas of the text-input-guide interface 200. Also, the plurality of text-input keys 112 and 113 may correspond to the plurality of the divided areas of the text-input-guide interface 200. If the text-input-guide interface 200 is divided into a first area 210 and a second area 220, a first text-input key 112 and a second text-input key 113 may be provided, with the first text-input key 112 and the second text-input key 113 corresponding to the first area 210 and the second area 220, respectively. As an exemplary embodiment, it will be described that the input unit 110 includes the first text-input key 112 and the second-input key 113.

If the plurality of text-input keys 112 and 113 are included, a cell of a predetermined area of the divided areas may be focused on by a focus moving signal provided by the text-input key corresponding to the area. For example, a cell of the first area 210 is focused on by a focus moving signal (hereinafter, referred to as a "first focus moving signal") provided by the first text-input key 112. And a cell of the second area 220 is focused on by a focus moving signal (hereinafter, referred to as a "second focus moving signal") provided by the second text-input key 113.

The focus-moving signal provided by each text-input key moves a focus, which is present in a predetermined area of the text-input-guide interface 200, to another area. As such, if the second focus-moving signal is provided while a predetermined cell of the first area 210 (see FIG. 2) is focused on, focusing on a predetermined cell of the second area 220 (see FIG. 2) is possible. Conversely, if the first focus-moving signal is provided while a predetermined cell of the second area 220 is focused on, focusing on a predetermined cell of the first area 210 is also possible.

According to an embodiment of the invention, a focused cell in a predetermined area of the divided areas, is selected by a selecting signal provided by a text-input key not corresponding to the predetermined area. When a predetermined cell of the first area 210 is focused on, the focused cell is selected by the second selecting signal provided by the second text-input key 113. When a predetermined cell of the second area 220 is focused on, the focused cell is selected by the first selecting signal provided by the first text-input key 112.

The control unit 130 connects components in the text display device. The control unit 130 determines whether the text-input-mode key 111 of the input unit 110 is input, and then controls operations of the device according to the determined result. Specifically, if the text-input-mode key 111 is not pressed, the control unit 130 controls a movement of a pointer (not shown) according to the focus moving signal provided by the text-input key. If the text-input-mode key 111 is pressed, a corresponding signal is provided to the text-input-guide-interface-providing unit 120 so that the text-input-guide interface 200 is displayed.

The text-input-guide interface providing unit 120 provides the text-input-guide interface 200 to guide a user to input text. The text-input-guide interface 200 will be described in the following with reference to FIG. 2.

The text-input-guide interface providing unit 120 enables a predetermined cell to be focused on when the text-input-guide interface 200 is displayed. If a cell indicating the letter "k" is focused on when the text-input mode is run, the text-input-guide-interface-providing unit 120 focuses on the cell indicating the letter "k" when displaying the text-input-guide interface 200. In another exemplary embodiment, a recently selected cell may be focused on. Specifically, after a user inputs a word, for example, "love", if the text-input mode is re-run, a cell indicating the letter "e" may be focused on when the text-input-guide interface 200 is displayed. Here, the textinput-guide interface providing unit 120 highlights the focused cell in order to separate the focused cell from the unfocused cells.

After the text-input-guide interface 200 is displayed, the text-input-guide interface providing unit 120 focuses on a predetermined cell according to a command of a user. If the focused cell is selected, the text-input-guide interface providing 120 generates a control code, e.g., an ASCII code, for text that is indicated by the corresponding cell with reference to a mapping table (refer to reference number 300 of FIG. 3) stored in a storage unit 140, which will be described later. The created control code is provided to a control unit 130. The mapping table 300 will be described with reference to FIG. 3.

The storage unit 140 stores the mapping table 300 including text information mapped to each cell of the text-input-guide interface 200. The storage unit 360 may be, but is not limited to, at least one of a nonvolatile memory device such as a cache, read-only memory (ROM), programmable ROM (PROM), erasable PROM (EPROM), electrically erasable PROM (EEPROM), flash memory, random access memory (RAM), a volatile memory device such as random access memory (RAM), or a storage medium such as a hard disk drive (HDD).

A display unit 150 visually displays a command processing result. If the text-input mode key 111 is input by a user, the display unit 150 displays the text-input-guide interface 200. A user may input text when the text-input-guide interface 200 is visible.

FIG. 2 illustrates a text-input-guide interface 200 provided by a text display device according to an exemplary embodiment of the present invention. As shown in FIG. 2, the illustrated text-input-guide interface 200 includes a plurality of cells. In each cell, at least one of, e.g., Korean letters, English letters, numbers, and special symbol text may be mapped depending on the mode being used at the time. Cells composing the text-input-guide interface 200 may be arranged in various ways, e.g., in a round-shape or in a matrix. FIG. 2 shows a case where cells of the text-input-guide interface 200 are arranged in a matrix.

The text-input-guide interface 200 may be divided into a plurality of areas including a plurality of cells. The number of divided areas should be the same as the number of the text-input keys 112 and 113 included in the input unit 110, although, of course, embodiments of the invention are anticipated for which this is not the case. For example, if the input unit 110 includes the first text-input key 112 and the second text-input key 113, the text-input-guide interface 200 should be divided into the first area 210 and the second area 220. If the input unit 110 includes first, second, and third text-input keys, the text-input-guide interface 200 should be divided into first, second, and third areas. FIG. 2 shows that the text-input-guide interface 200 is divided into the left first area 210 and the right second area 220.

FIG. 3 illustrates a mapping table 300 according to the embodiment of FIG. 2. As shown in FIG. 3, the mapping table 300 includes information to allow for an identification of cells, and information related to text that is mapped to each cell. Here, the information related to text that is mapped to each cell is classified by text-input mode and area, and is then made into a table. As shown in FIG. 3, the Korean letters, English letters and special symbols are respectively mapped to the first, second, and third input modes, and mapping information is classified according to whether a shift key is activated. If the cell focused on in the text-input-guide interface 200 of FIG. 2 is selected, the text-input-guide interface providing unit 120 enables the text, which is mapped with the selected cell, to be input to a text-input area 230 with reference to the mapping table 300 of FIG. 3 according to whether the currently set text-input mode is activated and whether a shift key function is activated. Thus, if the text-input mode is the second text-input mode, i.e., the English alphabet text-input mode and the shift function is not activated, when a cell indicating the capitalized letter "S" is selected in the text-input-guide interface, the text-input-guide interface providing unit 120 enables the lower case letter "s" to be input in the text-input area 230. If the shift function is activated, the text-input-guide interface providing unit 120 enables the capitalized letter "S" to be input in the text-input area 230.

A text-input method will now be described with reference to FIGS. 4A to 4J. FIGS. 4A to 4J illustrate a text-input guide user interface 200 displayed via a display unit 150.

When the text-input-mode key 111 is input, the text-input-guide interface 200 illustrated in FIG. 4A is displayed via the display unit 150. In the text-input-guide interface 200, a cell that is focused on is displayed. FIG. 4A illustrates that a cell indicating the upper case letter "D" is focused on. When the text-input-guide interface 200 is displayed, the cell last-selected by a user may be focused on.

Here, it is understood that, when the text-input-guide interface 200 is displayed, the text-input mode, set as a basic value, is applied. In the text display device, if first, second and third modes are provided as the text-input modes, and the first mode is set as a basic value, when the text-input-mode key 111 is pressed, the text-input-guide interface 200 of FIG. 4A is displayed at the same time with the first mode, i.e., the Korean text mode, is run. Here, if the text-input-mode key 111 is pressed again, the text-input mode is converted into the second mode, e.g., the English text-input mode.

Then, a user may input text by using the first text-input key 112 and the second text-input key 113.

Figure 4B:
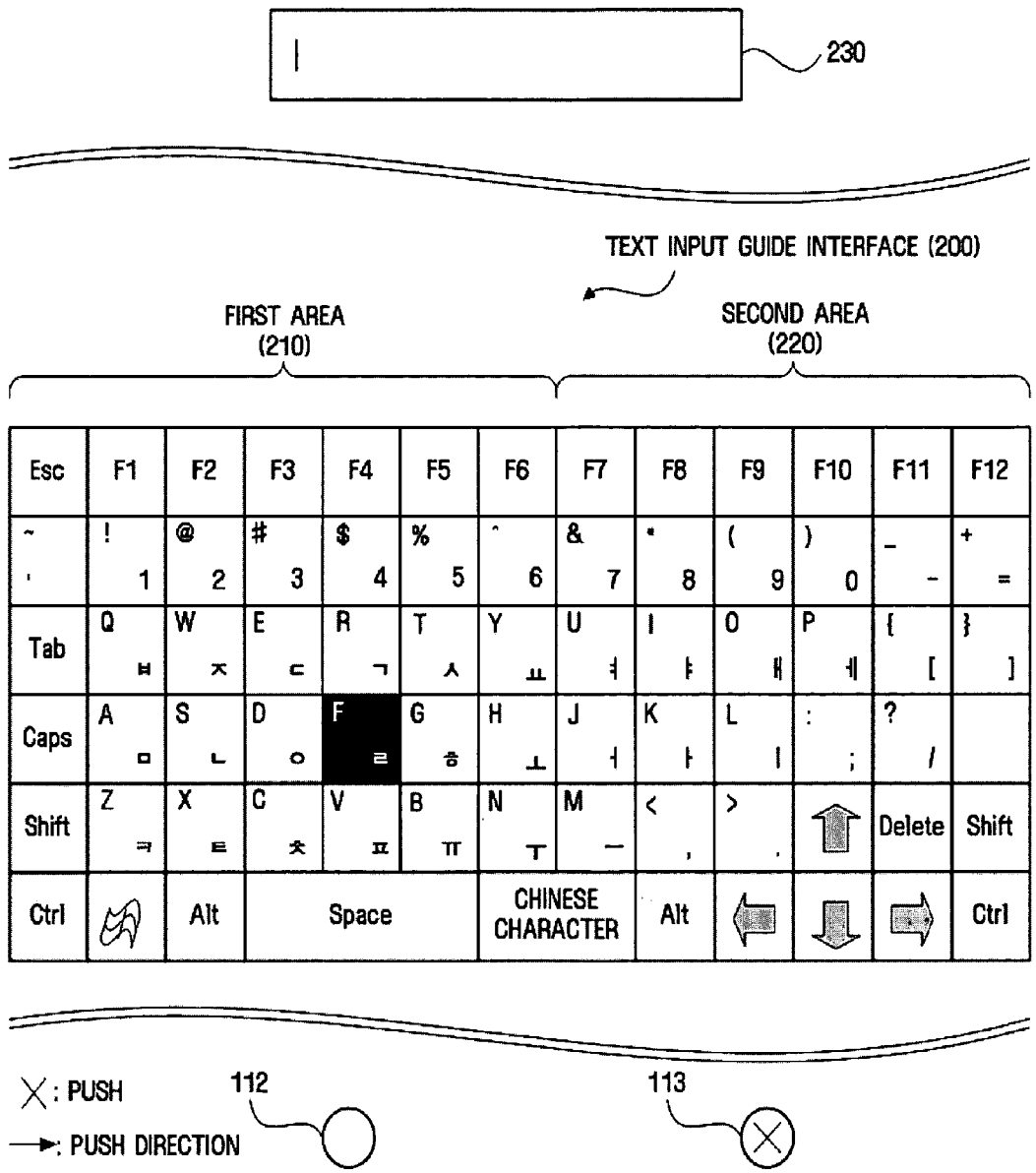

To input the word "fog," a user focuses a cell indicating the letter "f" by pressing the first text-input key 112 in a right direction, as illustrated in FIG. 4B. As illustrated in FIG. 4B, the cell indicating the letter "f" is focused on, and the user selects the corresponding cell by pushing the second text-input key 113. As a result, the letter "f" is input in the text-input area 230, as illustrated in FIG. 4C.

Figure 4C:
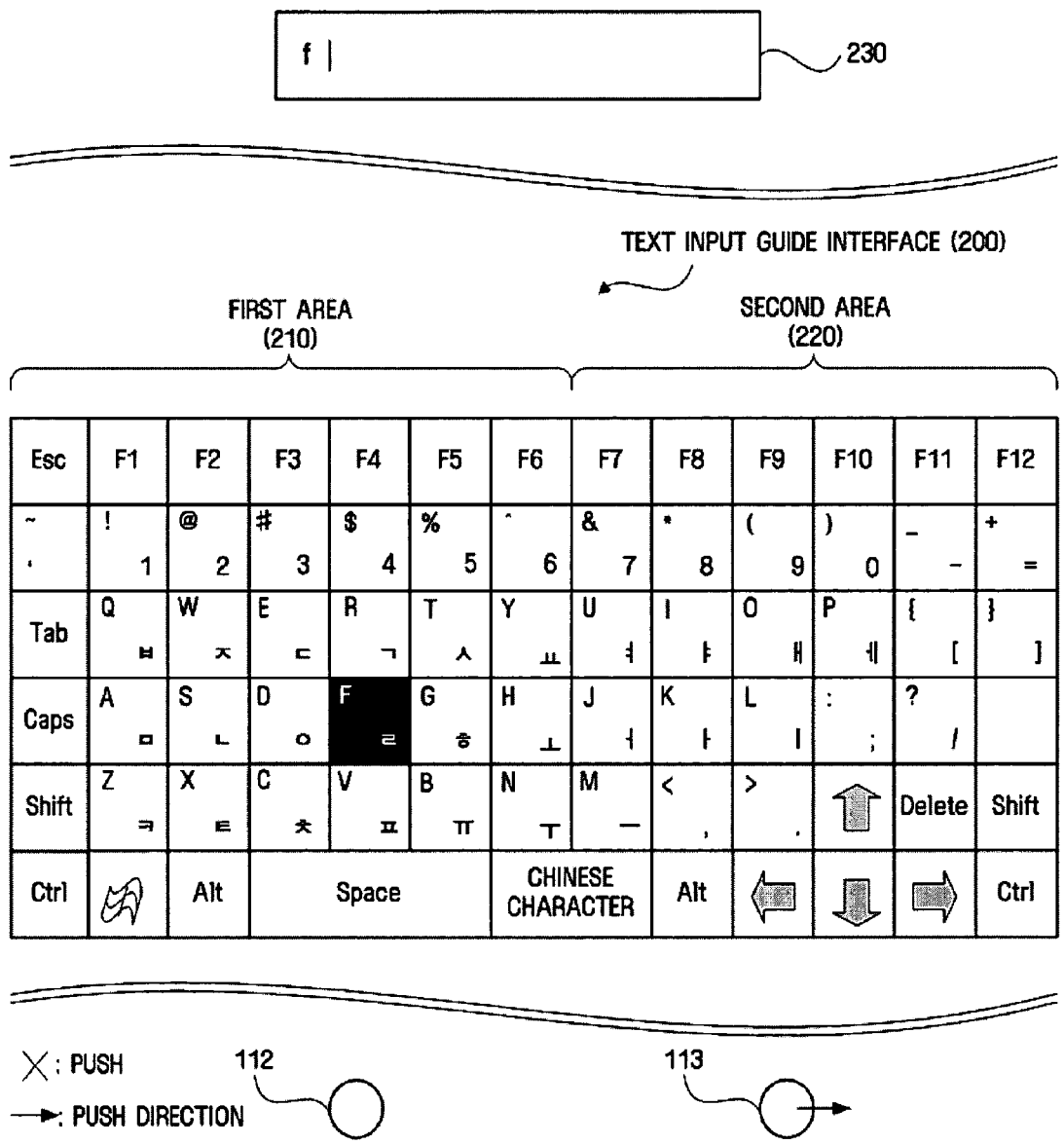

As shown in FIG. 4C, a user enables a predetermined cell of the second area 220 to be focused on by pressing the second text-input key 113 in a predetermined direction. That is, a focus, which is present in the first area 210, may be moved to a predetermined cell of the second area 220. Here, a cell focused on by the second focus moving signal may be a cell set in advance or the last-selected cell, of cells of the second area 220. If a cell focused on by the second focus moving signal is designated as a cell indicating the letter "k," of cells of the second area 220, the cell indicating the letter "k" is focused on, as illustrated in FIG. 4D.

Figure 4D:
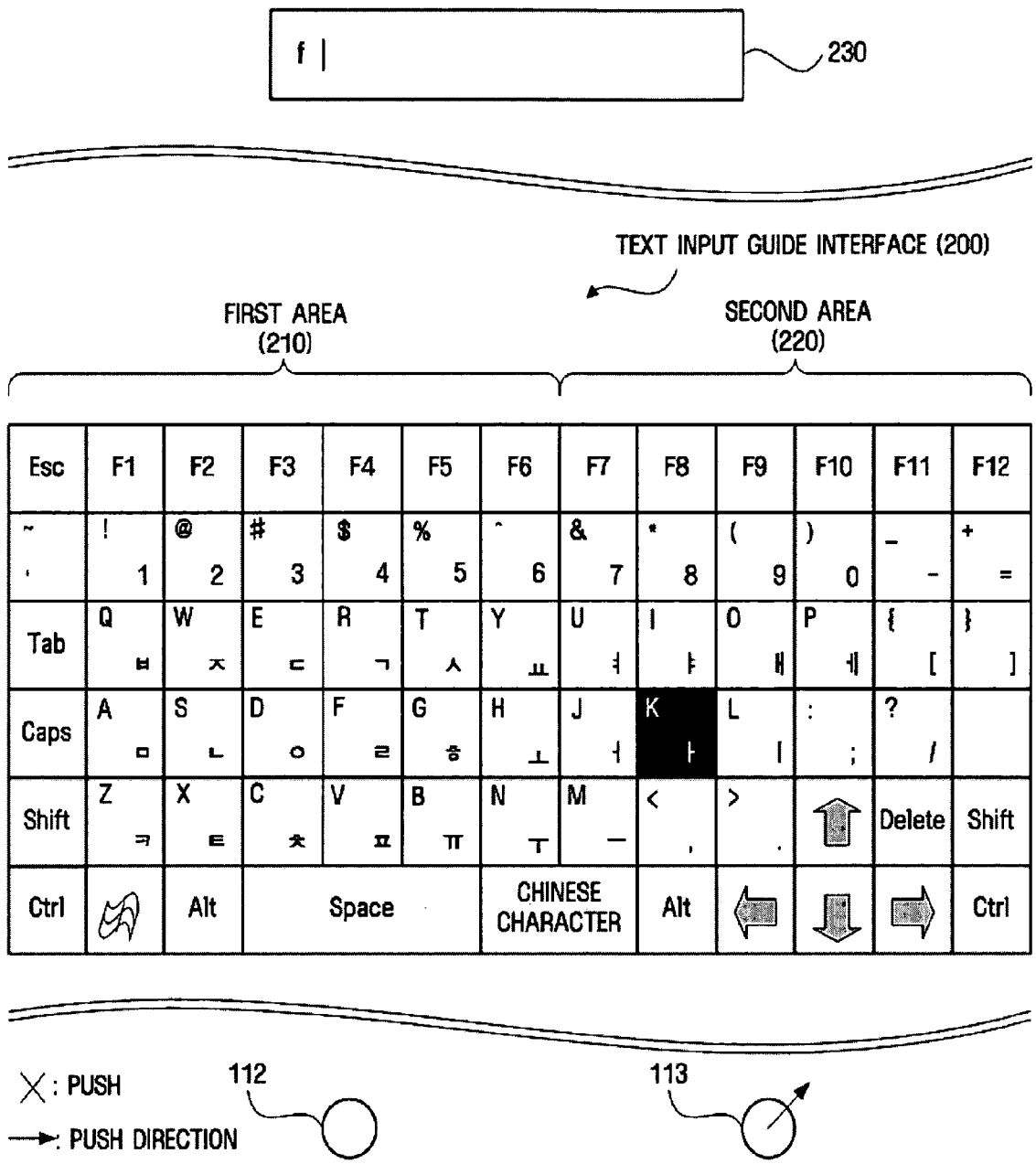
Figure 4E:
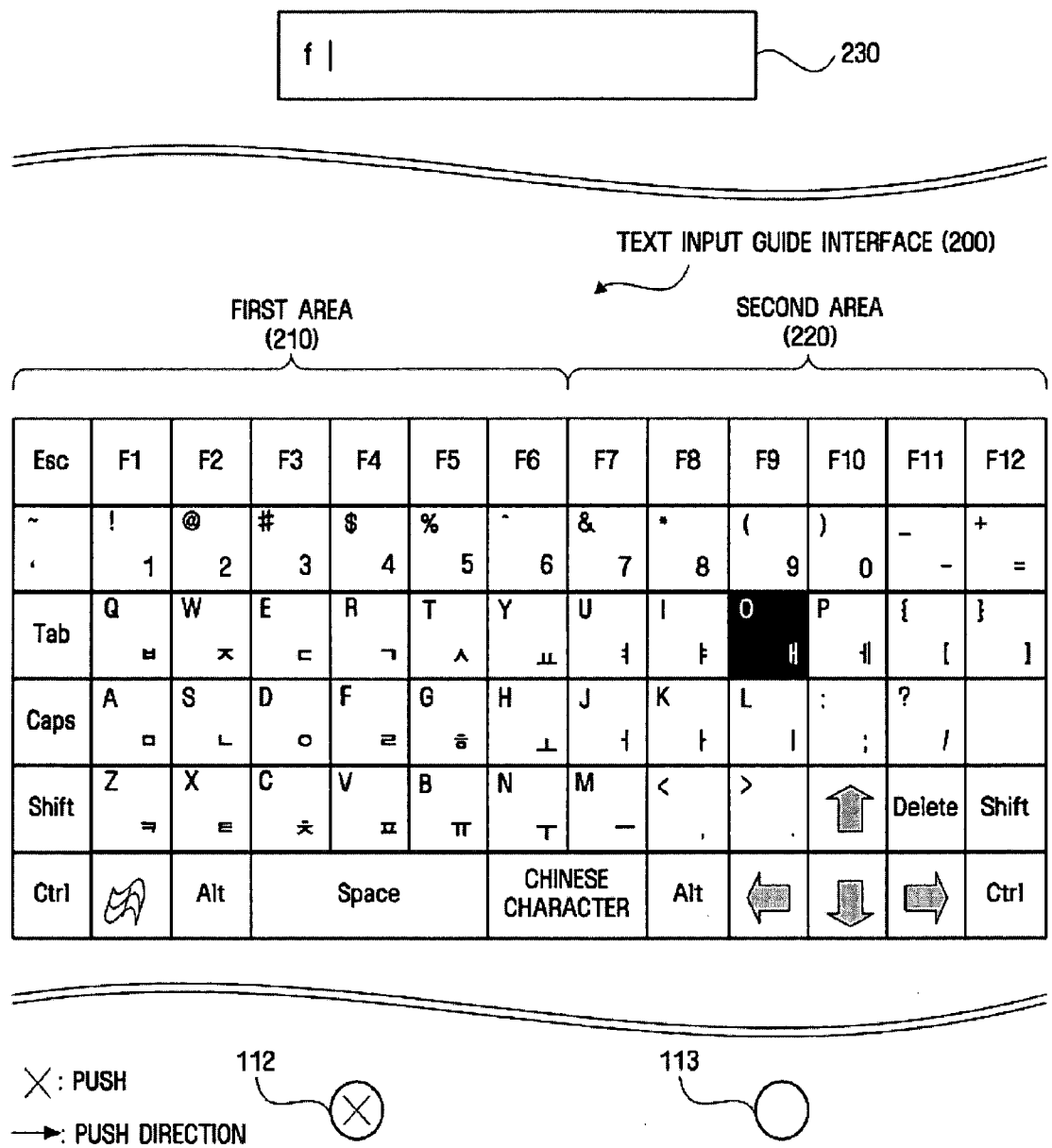
Figure 4F:
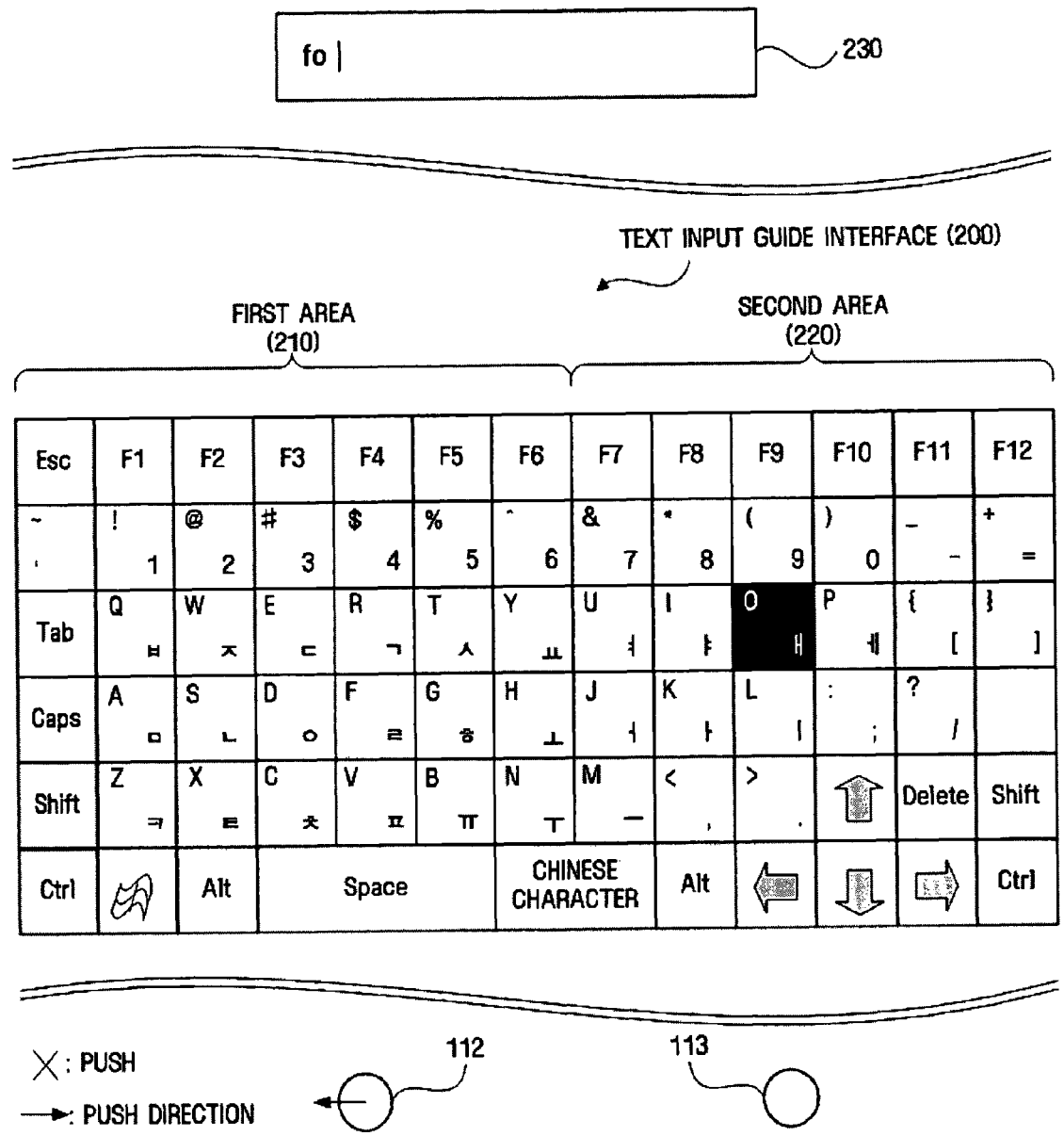

In FIG. 4D, when the cell indicating the letter "k" is focused on, the user focuses on a cell indicating the letter "o" by pressing the second text-input key 113 in a up-right direction, as illustrated in FIG. 4E. As illustrated in FIG. 4E, the cell indicating the letter "o" is then focused on, and the user is able to select the corresponding cell by pushing the first text-input key 112. As a result, the letter "o" is input in the text-input area 230, as illustrated in FIG. 4F.

Figure 4G:
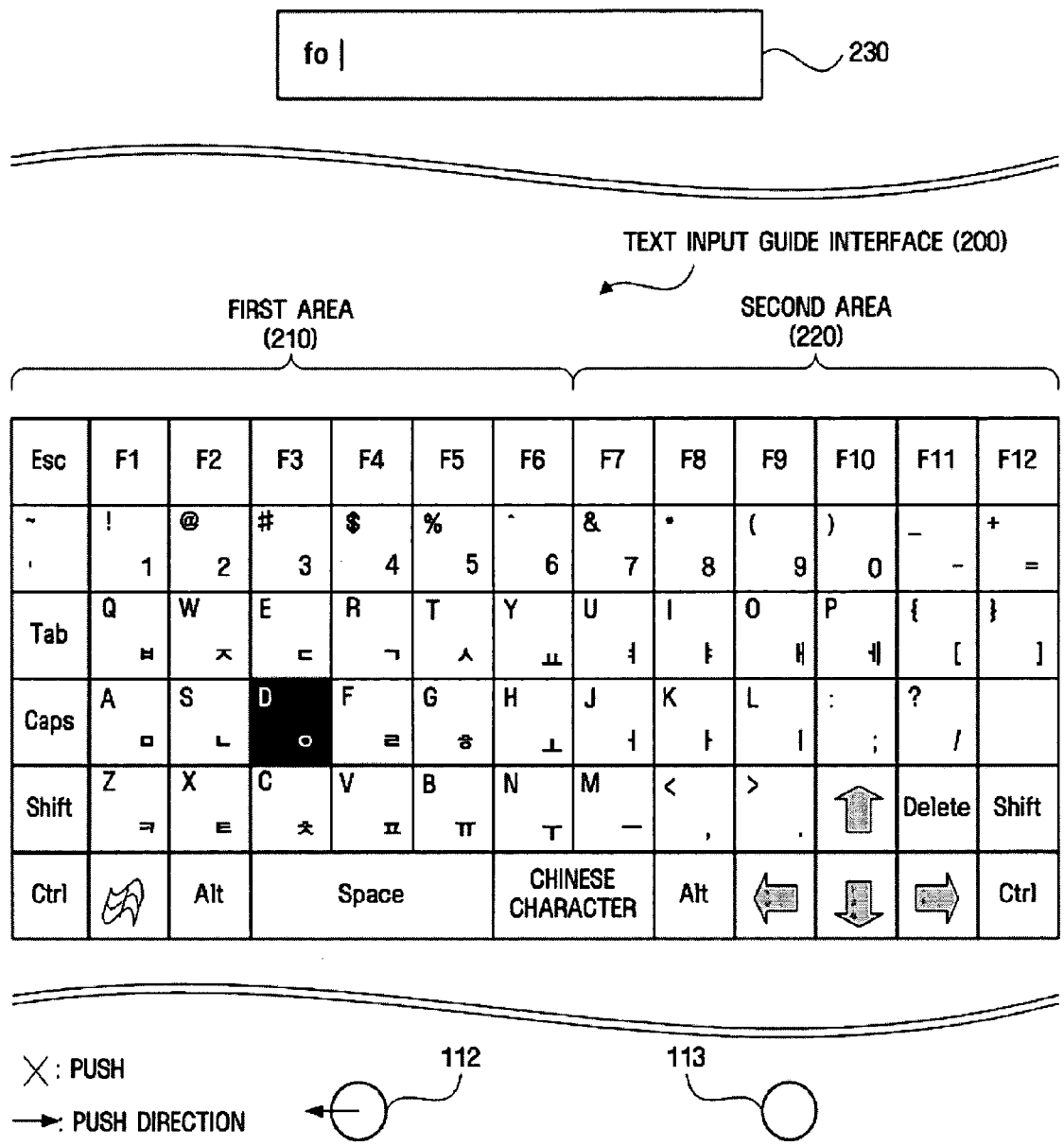

Then, a user may enable a predetermined cell of the first area 210 to be focused on by pressing the first text-input key 112 in a predetermined direction. Here, a cell designated in advance by the first focus moving signal is focused on, i.e., the letter "d" as is illustrated in FIG. 4G. In an alternative embodiment of the invention, the last-selected cell of the first area 210 may be focused on. If a cell indicating the letter "f" was last-selected in the first area 210, the cell indicating the letter "f" is focused on as is illustrated in FIG. 4H.

Figure 4H:
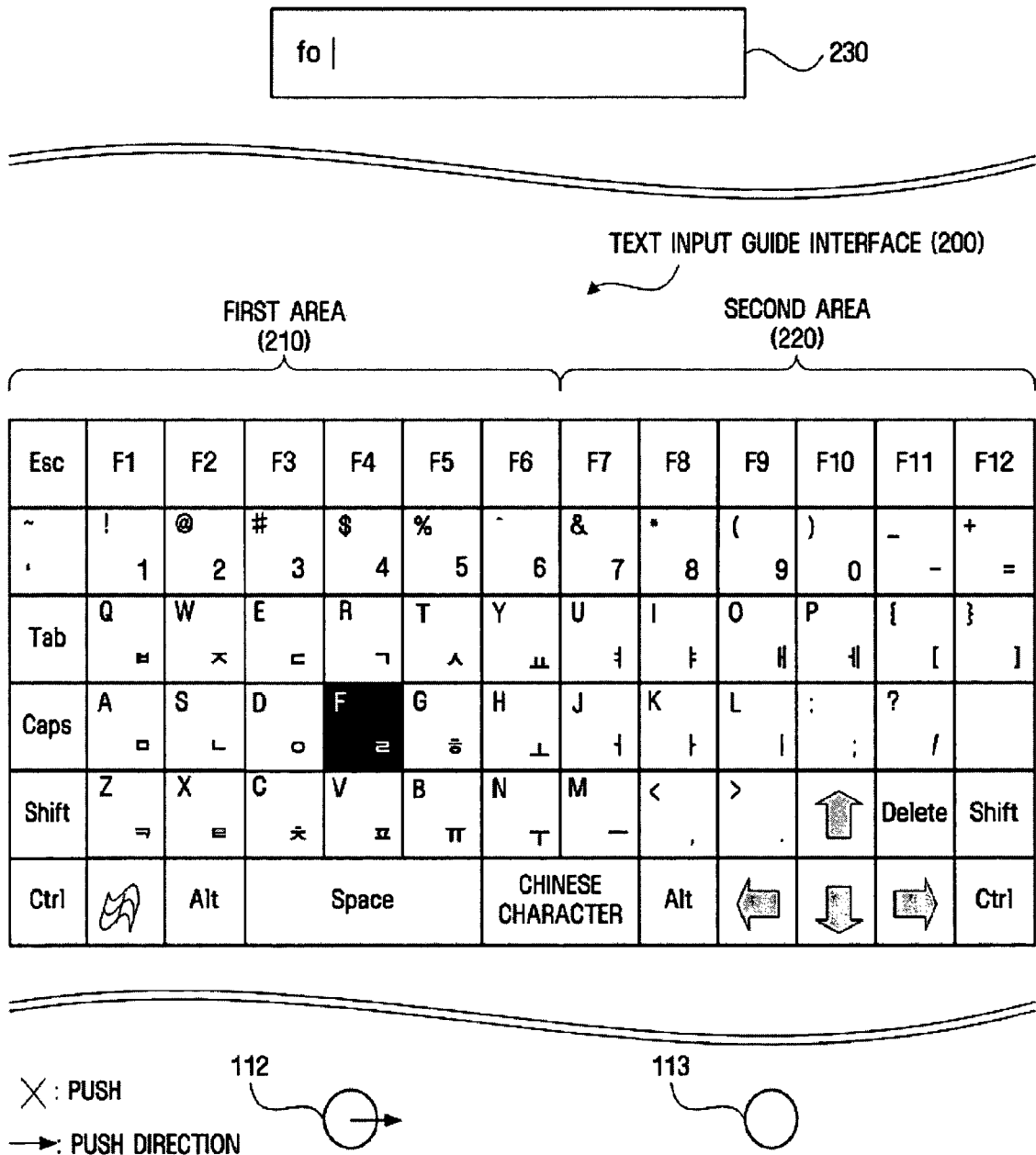
Figure 4I:
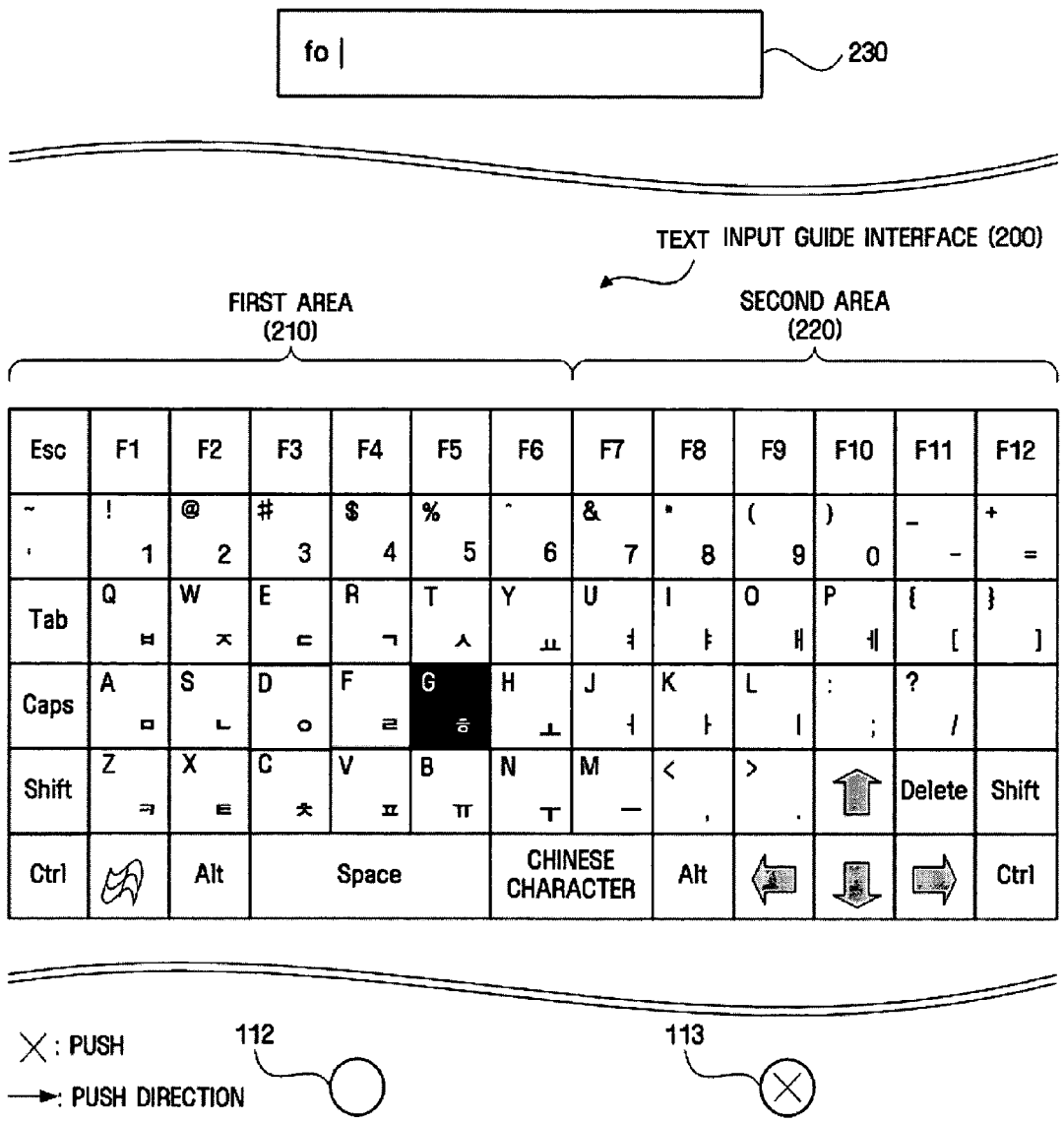
Figure 4J:
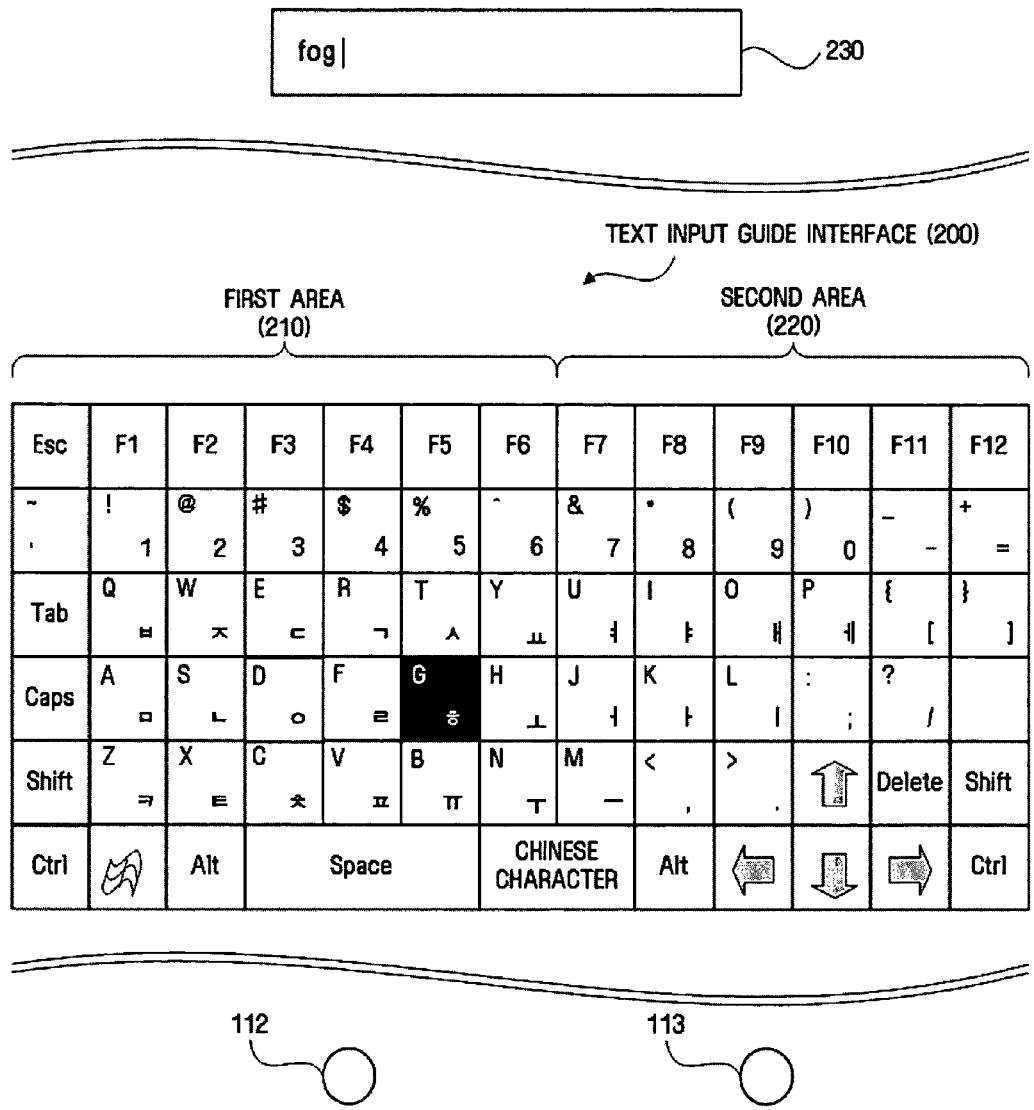

As shown in FIG. 4H, if the cell indicating the letter "f" is focused by the first focus moving signal, the user focuses a cell indicating the letter "g" by pressing the first text-input key 112 in a right direction, as is illustrated in FIG. 4I. Then, the user is able to select the corresponding cell by pushing the second text-input key 113. As a result, the letter "g" is input in the text-input area 230, as is illustrated in FIG. 4J.

An operation of a text-input device 100 will now be described with reference to FIGS. 4A to 5. FIG. 5 is a flowchart showing an operation of the text-input device 100.

The control unit 130 determines whether a key signal for a text-input-mode key is input via the input unit 110 (operation S510). According to the determined result, if the key signal for the text-input-mode key 111 is not input, the control unit 130 controls a movement of a pointer (not shown) according to a focus on moving signal provided by the first text-input key 112 or the second text-input key 113 (operation S520). That is, if the first text-input key 112 or the second text-input key 113 is pressed in a predetermined direction, the control unit 130 moves the pointer in the pressed direction. If the key signal for the text-input-mode key 111 is pressed, the control unit 130 provides a control signal corresponding to the input key signal to the text-input-guide-interface-providing unit 120.

The text-input-guide interface providing unit 120 displays the text-input-guide interface 200 illustrated in FIG. 4A via the display unit 150 according to the control signal provided by the control unit 130 (operation S530). Here, a mode set as a basic value is applied to a text-input mode. If the first, second, and third text-input modes are provided and the first text-input mode is set as a basic value in the text-input device 100, the text-input mode is able to input text corresponding to the first text-input mode when the text-input-mode key is pressed. Here, a predetermined cell is focused in the text-input-guide interface 200.

Then, the text-input-guide-interface-providing unit 120 determines what type of key signal is input via the input unit 110 (operation S540). According to the type of key signal that is input, the text-input-guide-interface-providing unit 120 converts the text-input mode and either moves a focus to a predetermined cell or inputs the text, which is indicated by the cell focused on according to the current-set text-input mode, to the text-input area 230.

If the text-input-mode key 111 is re-input, the text-input-guide interface providing unit 120 converts the text-input mode based on the current text-input mode according to the input signal (operation S550). If the current text-input mode is the first text-input mode, e.g., a Korean text-input mode, the text-input-guide interface providing unit 120 converts the text-input mode into the second text-input mode, e.g., an English text-input mode.

If the focus moving signal is input, the text-input-guide interface providing unit 120 determines whether the input focus moving signal is a focus moving signal corresponding to the area including the current-focused cell. If the focused cell is in the first area 210, the text-input-guide interface providing unit 120 determines whether the input focus moving signal is the first focus moving signal.

According to the determined result, if the input signal is the first focus moving signal ("yes" in operation S570), the text-input-guide interface providing unit 120 focuses a cell, which is located in a direction corresponding to the first focus moving signal, in the first area (operation S571). Specifically, if the first text-input key 112 is pressed in a right direction when the cell indicating "d" is focused on in the first area 210, as illustrated in FIG. 4A, the text-input-guide interface providing unit 120 focuses the cell indicating "f," as illustrated in FIG. 4B.

Further, according to the determined result, if the input signal is not the first focus moving signal ("no" in operation S570), but, rather, the second focus moving signal, the text-input-guide interface providing unit 120 focuses a predetermined cell of the second area 220 (operation S572). Specifically, if the second text-input key 113 is pressed in a predetermined direction when the cell indicating "f" is focused in the first area 210, as illustrated in FIG. 4B, the text-input-guide interface providing unit 120 focuses the cell indicating "k" in the second area 220, as illustrated in FIG. 4D. Here, the focused cell may be a cell that is set in advance or the last-selected cell. If a cell indicting "u" in the second area 220 is the last-selected cell, the cell indicating "u" may be focused on.

When the selecting signal is input, the text-input-guide interface providing unit 120 determines whether the input selecting signal is available (operation S560). For example if a cell of the first area 210 is focused on, as illustrated in FIG. 4B, the text-input-guide interface providing unit 120 determines whether the second selecting signal is input.

In the determined result, if the selecting signal is available ("yes" in operation S560), the text-input-guide interface providing unit 120 generates a control signal for text indicated by the focused cell with reference to the mapping table 300 stored in the storage unit 140, and then provides the control signal to the control unit 130 (operation S561). The control unit 130 performs a command based on the control signal provided by the text-input-guide interface providing unit 120 (operation S562). That is, the text mapped to the selected cell is input to the text-input area 230.

In the embodiment shown in FIG. 4B, if the second selecting signal is input, the text-input-guide interface 200 provides a control signal for the English letter "f" to the control unit 130 because the current text-input mode is the second text-input mode, i.e., the English letter input mode. Then, the control unit 130 inputs "f" to the text-input area 230. Here, if the shift cell is selected in the text-input-guide interface unit 200, the text-input-guide interface providing unit 120 enables "F" to be input to the text-input area 230.

In the embodiment shown in FIG. 4B, if the text-input mode is the first text-input mode, i.e., the Korean letter input mode, the text-input-guide interface 200 enables the Korean letter "ㄹ" to be input to the text-input area 230.

After performing operations corresponding to the types of input key signals as described above, the text-input-guide interface providing unit 120 determines whether the text-input mode ends (operation S580).

According to the determined result, if the text-input mode does not end ("no" in operation S580), the text-input-guide interface providing unit 120 repeats the above-described operations S540 to S580. That is, the text-input-guide interface providing unit 120 converts the text-input mode, focuses on a predetermined cell, or selects the focused cell according to types of the input key signal.

According to the determined result, if the text-input mode ends ("yes" in operation S580), the text-input-guide interface providing unit 120 turns off the text-input-guide interface 200 indicated via the display unit 150 (operation S590).

Figure 6A:
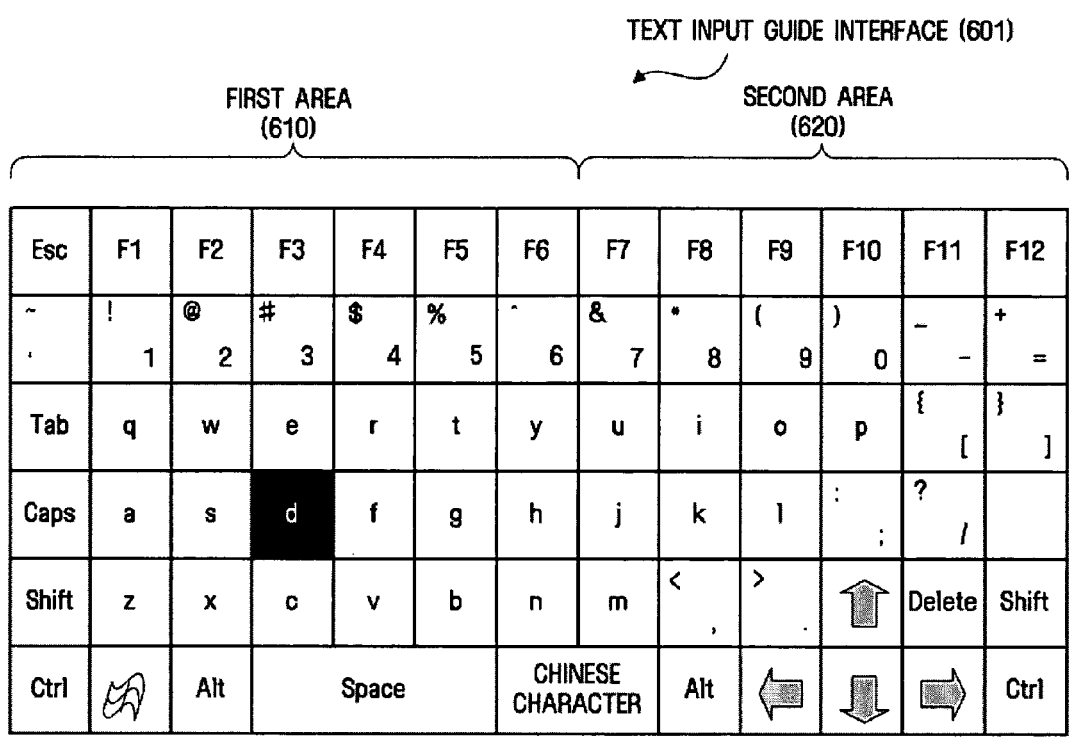
Figure 6B:
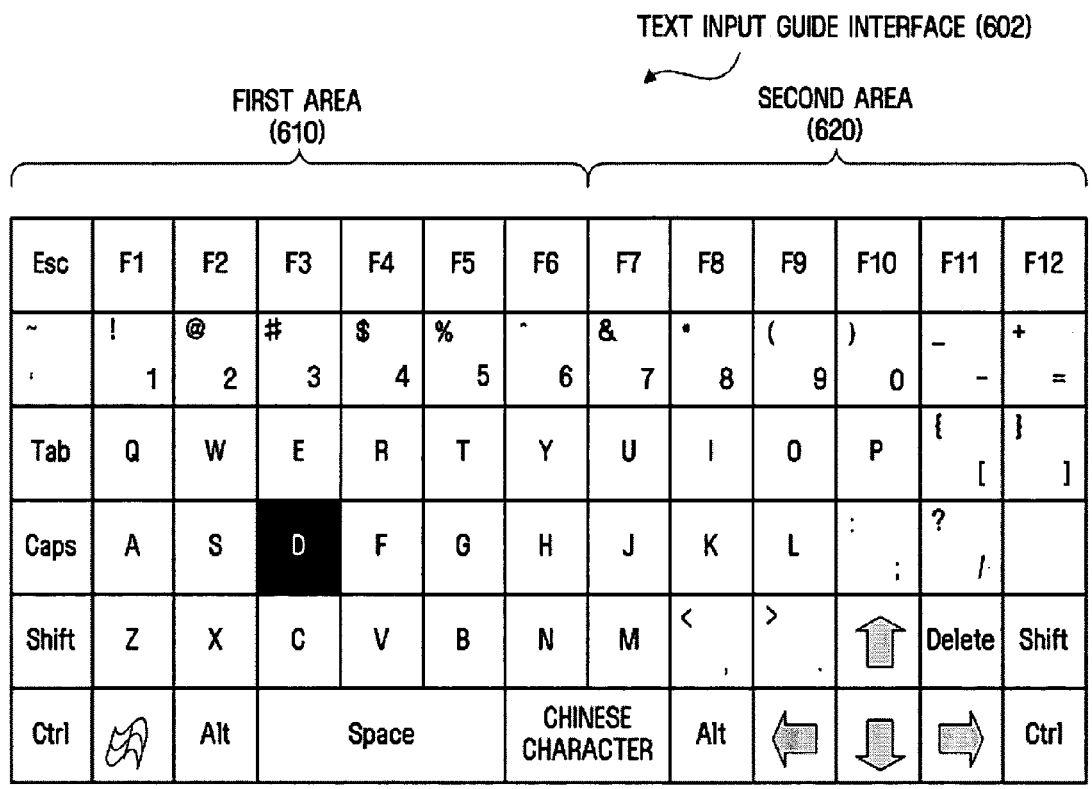

In the embodiments of the invention discussed above and/or other embodiments of the invention, a same text-input-guide interface 200 is indicated when a text-input mode is converted. According to another embodiment of the invention, a text corresponding to the mode may be indicated in each cell of the text-input-guide interface. If the text-input device 100 provides first, second, and third modes corresponding to an English lower-case letter input mode, an English capital letter input mode, and a special symbol text-input mode, when the text-input mode is set as the first mode, an English lower-case letter is indicated in each cell of the text-input-guide interface 601, as illustrated in FIG. 6A. When the text-input mode is set as the second mode, an English capital letter is indicated in each cell of the text-input-guide interface 602, as illustrated in FIG. 6B. When the text-input mode is set as the third mode, a special symbol text is indicated in each cell of the text-input-guide interface 603, as illustrated in FIG. 6C.

As is described above, the text-input device and method according to aspects of the present invention produce one or more of the effects described below. First, since a focus moving signal and a selecting signal are divided, an input error may be minimized when text is input. Second, since numbers of keys that allow for an inputting of text may be minimized, a digital device may also be miniaturized. Third, since a focus moving signal and a selecting signal are divided, a text-input speed may be increased.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A text-input device comprising:
    a display unit that displays a user interface, which is divided into a plurality of individually presented areas each area including a plurality of cells where predetermined text is displayed;
    an input unit that includes a plurality of text-input units to provide a focus moving signal that moves a focus to select a predetermined cell in one of the plurality of individually presented areas and a selecting signal that selects the focused cell, each of the plurality of text-input units corresponding to a different one of the individually presented areas;
    a user interface providing unit that generates a control signal corresponding to the selected cell with reference to a mapping table according to whether the selecting signal is available; and
    a control unit that performs a control command based on the control signal,
    wherein the plurality of text-input units includes a first text-input unit corresponding to an area of the individually presented area in which the focus is currently located, and a second text-input unit not corresponding to the area, and
    wherein the focus moves to an individually presented area corresponding to the second text-input unit when the focus moving signal is provided from the second text-input unit.

2. The device according to claim 1, wherein the text comprises at least one of Korean letters, English letters, special symbol text, and/or numbers.

3. The device according to claim 1, wherein the focus moving signal focuses a predetermined cell of an area corresponding to the text-input units.

4. The device according to claim 1, wherein the selecting signal selects the focused cell if the focused cell is present in the area not corresponding to the text-input units.

5. The device according to claim 1, wherein each of the text-input units comprises either a jog switch or a track ball.

6. The device according to claim 1, wherein the plurality of cells are arranged in a matrix.

7. The device according to claim 1, wherein the plurality of text-input units provide a focusing signal corresponding to at least one of left, right, up, down, up-left, up-right, down-left, and down-right directions.

8. The device according to claim 1, wherein the mapping table comprises at least one of information related to identifying the cell, information related to text that is mapped to the cell, information related to an area of the cell, and information related to the text-input mode.

9. The device according to claim 1, wherein the input unit further comprises a text-input-mode key determining whether to indicate the user interface.

10. The device according to claim 9, wherein the text-input mode key converts the text-input mode.

11. A method of operating a portable electronic device, comprising:
    displaying a user interface divided into a plurality of individually presented areas, each area including a plurality of cells where a predetermined text is displayed,
    receiving a focus moving signal that moves a focus to select a predetermined cell in one of the plurality of individually presented areas and a selecting signal that selects the focused cell from a plurality of text-input units, each of the plurality of text-input units corresponding to a different one of the individually presented areas,
    creating a control signal corresponding to the selected cell with reference to a mapping table according to whether the selecting signal is available, and
    performing a control command based on the control signal,
    wherein the plurality of text-input units includes a first text-input unit corresponding to an area of the individually presented areas in which the focus is currently located, and a second text-input unit not corresponding to the area, and
    wherein the focus moves to an individually presented area corresponding to the second text-input unit when the focus moving signal is provided from the second text-input unit.

12. The method according to claim 11, wherein the text comprises at least one of Korean letters, English letters, special symbol text, and/or numbers.

13. The method according to claim 11, wherein the focus moving signal focuses on a predetermined cell of an area corresponding to the text-input units.

14. The method according to claim 11, wherein the selecting signal selects the focused cell if the focused cell is present in the area not corresponding to the text-input units.

15. The method according to claim 11, wherein each of the text-input units comprises either a jog switch or a track ball.

16. The method according to claim 11, wherein the plurality of cells are arranged in a matrix.

17. The method according to claim 16, wherein the focusing signal corresponds to at least one of left, right, up, down, up-left, up-right, down-left, and down-right directions.

18. The method according to claim 11, wherein the mapping table comprises at least one of information related to identifying the cell, information related to text that is mapped to the cell, information related to an area of the cell, and information related to the text-input mode.

19. The method according to claim 11, further comprising converting a text-input mode.

20. A method of inputting a letter into a device that is capable of supporting at least two modes, each mode displaying one of first and second text areas from which to choose the letter, the method comprising:

setting the device into the one of the modes that includes the letter;

when a first input key is pressed, inputting a second selecting signal if the letter is included within a second text area of the mode and is focused on;

when the first input key is manipulated directionally and the letter is included within a first text area of the mode, inputting a first directional signal to move the focus from a secondary letter to the letter if the letter is not initially focused on when a text area changing signal is input;

when a second input key is pressed, inputting a first selecting signal if the letter is included within a first text area of the mode and is focused on;

when the second key is manipulated directionally and the letter is included within the second text area, inputting a second directional signal to move the focus from a secondary letter to the letter if the letter is not initially focused on when the text changing signal is input;

when the first input key is manipulated directionally and the letter is included within the second text area, inputting the text area changing signal to change a focus to a predetermined cell in the first text area; and when the second input key is manipulated directionally and the letter is included within the first text area, inputting the text area changing signal to change a focus to a predetermined cell in the second text area.

21. The method according to claim 20, wherein the second input key generates the first selecting signal when pressed and the first input key generates the first directional signal when manipulated directionally if the first text area is displayed.

22. The method according to claim 20, wherein the second key generates the text area changing signal when manipulated directionally if the first text area is displayed.

23. The method according to claim 21, wherein the first input key generates the second selecting signal when pressed and the second input key generates the second directional signal when manipulated directionally when the second text area is displayed.

24. The method according to claim 21, wherein the first key generates the text area changing signal when manipulated directionally if the second text area is displayed.

25. The method according to claim 20, wherein each of the first and second input keys comprises either a jog switch or a track ball, which are both capable of being pressed so as to generate the first and second selecting signals, respectively, and/or manipulated in various directions so as to generate the first and second directional signals, respectively.

26. The method according to claim 20, wherein, if the letter is focused on, further comprising activating a shift signal so that the letter may be input in a capitalized form thereof.

* * * * *